United States Patent
Conorich (10) Patent No.: US 6,358,080 B1
(45) Date of Patent: Mar. 19, 2002

(54) SNAP-IN MODULE SYSTEM (75) Inventor: Theodore A. Conorich, Lake Hiawatha, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/577,275

(22) Filed: May 23, 2000

(51) Int. Cl.[7] .......................... H01R 4/50; H01R 13/625
(52) U.S. Cl. .................... 439/341; 439/376; 439/488
(58) Field of Search ............................ 439/341, 488, 439/376, 327, 328

(56) References Cited

U.S. PATENT DOCUMENTS

| | | | | |
|---|---|---|---|---|
| 4,941,837 A | * | 7/1990 | Nakamura | 439/341 |
| 4,972,296 A | * | 11/1990 | Chu | 439/341 |
| 5,148,353 A | * | 9/1992 | Morgan et al. | 439/341 |
| 5,253,140 A | * | 10/1993 | Inoue et al. | 439/341 |
| 5,359,489 A | * | 10/1994 | Hass et al. | 439/341 |
| 5,398,162 A | * | 3/1995 | Bice | 439/341 |
| 5,662,493 A | * | 9/1997 | Reichle | 439/341 |
| 6,083,027 A | * | 7/2000 | Sato | 439/341 |

* cited by examiner

Primary Examiner—Brian Sircus
Assistant Examiner—Hae Moon Hyeon
(74) Attorney, Agent, or Firm—Gibbons, Del Deo, Dolan, Griffinger & Vecchione (57) ABSTRACT

An electrical connection system is provided that makes patch cord connections with snap-in jack modules using a hinged plug and jack mating system which results in simple connections with low insertion forces and enhanced side to side stability for the patch cord connectors. The hinged connector keeps the label area clear of cordage while troughs between adjacent rows of connectors accommodate the patch cords and facilitate efficient cable management.

8 Claims, 10 Drawing Sheets

SNAP-IN MODULE SYSTEM

RELATED APPLICATIONS

The present patent application is related to U.S. patent application Ser. No. 09/575,969, entitled "HINGED CONNECTION SYSTEM", being concurrently filed herewith and having a filing date of May 23, 2000; U.S. patent application Ser. No. 09/577,274, entitled, "CONTACTS FOR HINGED CONNECTION SYSTEM" being concurrently filed herewith and having a filing date of May 23, 2000; to U.S. patent application Ser. No. 09/575,902, entitled "CONNECTOR SYSTEM WITH RELEASABLE LATCH", being concurrently filed herewith and having a filing date of May 23, 2000; to U.S. patent application Ser. No. 09/575,968, entitled "SLIDING CABLE FIXTURE", being concurrently filed herewith and having a filing date of May 23, 2000; to U.S. patent application Ser. No. 09/577,273, entitled, "BOARD MOUNTED JACK MODULE", being concurrently filed herewith and having a filing date of May 23, 2000; all of which have a common inventor and assignee and being incorporated herein by reference.

FIELD OF THE INVENTION

The present invention relates to electrical connection systems, and more particularly to electrical connections systems for use in telecommunications.

BACKGROUND OF THE INVENTION

In the telecommunications industry, connecting systems comprising an array of insulation displacement contacts (IDC) are typically used in telephone company central offices and office buildings for electrical connection between cables and cross-connect wiring. These electrical connection systems are used throughout the telecommunications industry in order to interconnect corresponding wires in two sets of wires. The predominant connecting systems for building terminal cross-connect systems are currently the modular RJ45 connector system and the 110 connection system or variations of these connection systems. The modular type connector systems use a plug and jack type interface for making connections.

The RJ45 version of a modular connector system is a 4-pair connector system that cannot be broken down to smaller increments without wasting connector positions. A patch cord connection is made to a jack by deflecting a set of cantilevered spring wires in a jack with a mating set of fixed pressure contact surfaces in the plug, as the plug is pushed into the jack with a relatively low force. As the plug completes its insertion into the jack, it automatically latches with an audible click. By gripping the exposed back end of the plug, and depressing a lever, the latch can be released. Spring loaded wire contacts within the jack essentially push the plug out. The RJ45 modular systems have a panel with a flat front face. When a patch cord is installed, the cordage comes straight out from the panel. Cross-connect distribution rings bring the cordage back in along the face of the panel.

The 110 connector system is designed with insulation displacement connections (IDC) for both the cable connections and the cross-connect or patching connections. Therefore, a patching connection can be made by terminating cross-connect wires in the contacts IDC slots, or by inserting patch cord blades into those contact shots.

This Connector System forms a connector field that is front accessible, and is designed for wall mounting. Despite this design, the 110 system can be frame mounted, with the cables fed from the front in a manner similar to wall mounting. The cables can also be fed from the back of the frame. The front access is achieved by having a cross-connect field superimposed on a cable termination field; that is, superimposed on the cable routing. Cables are routed behind the wiring blocks, either in pre-mounted channels or between the rows of wiring block support legs. Cable ends are brought through their appropriate openings in the wiring block to the cable termination surface, and the exposed cable sheath is removed. The cable conductors are fanned out as twisted pairs to their appropriate termination ports in the index strips on the front face of a wiring block.

Connecting blocks, which include contacts having insulation displacement portions on two opposite ends, are brought down and snapped onto the index strip to form electrical connections between the contacts and conductors. The front surface formed by the connecting blocks is the cross-connect field. A designation strip is placed between alternate rows and is used to label the conductor terminations on the rows on either side of it.

When a cross-connect field is intended for use with patch cords, 100 pair wiring blocks typically alternate with horizontal troughs, with patch cords from the upper 2 rows going into an upper trough, and patch cords from the lower 2 rows going into a lower trough. When a high percentage of patch cord positions are populated, the patch cord connectors present an unruly appearance and the labeling becomes very difficult to read, making cord location a time consuming process.

Patch cords in the 110 connector system have contact blades that make connection by inserting into the top IDC slots of the contact elements. The IDC is designed to remove conductor insulation as it makes contact, and achieve a high enough contact force to make a stable long term connection to unplated wire. Repeated insertions of the patch cord blades past this entrance geometry, with its high contact force, reduces the life of the patch cord blades protective plating. This contact force (about 2 pounds) holds the patch cord blade by friction and prevents it from sliding out by about a third of a pound per contact. The contact slots are tapered so any vibration or wiggling of the patch cord would cause the blades to slowly walk out of the slots, unless something else held them in place.

Connecting blocks may have hemispherical buttons that match mating holes in the patch cords. By pulling on a mated patch cord, the side walls on the plug end flex as they slide over the connecting blocks' buttons; a snap-on/snap-off type of latch is enabled, and the plug end is disconnected. The force to overcome this latch and remove a 4-pair patch cord, with a straight pull, can be as high as 25 pounds. Removal can be effected by a side to side rocking of the patch cord. Because patch cord plugs are in close proximity to each other, removal of one patch cord can easily result in the dislodging of a neighboring patch cord. Therefore, technicians must be very deliberate and careful during cord tracing to avoid inadvertently dislodging a patch cord. Furthermore, the high friction on the buttons can cause extensive wear of the surfaces so that the retention capability of the connecting blocks degrades after multiple insertions and removals.

SUMMARY

A device according to the principles of the invention provides a simple, modular, and efficient patch cord connection. An exemplary system according to the principles of the invention includes a support structure to which a plurality of jack receptacles can be attached. By providing a plug having a rotatable end and a jack having a corresponding rotatable end, the jack can be hooked into a corresponding receptacle, engaging the rotatable plug end with the corresponding rotatable jack end, thereby establishing a fulcrum. The plug is then rotated around the fulcrum point to achieve a connection. The ease of engaging the hinging mechanism and rotating the jack into a latched mated position enable simple and reliable connections to be made.

In an exemplary embodiment, the jack includes a label surface with all cord connections occurring behind the label surface. Thus, the plug, most of the jack and all of the cordage is behind the label surface, providing an unobstructed view of the label surface, permitting fast and accurate identification of all cordage.

The present invention can accommodate any number of modules. Importantly, the support structure provides the back plane with support to allow a fill row of 24 circuits in a row on an EIA 310 type 19 inch frame. Each support structure forms a patch cord trough, thereby providing efficient cable management and connection flexibility.

BRIEF DESCRIPTION OF THE FIGURES

A more complete understanding of the present invention may be obtained from consideration of the follow description in conjunction with the drawings, in which.

DETAILED DESCRIPTION

The detailed description initially discusses the general concept and principles of the novel cross-connect system. Exemplary embodiments of the cross connect system are then described. Single and multiple connect versions of the cross connect system are then presented.

The Cross-Connect System

A cross-connect system according to the invention makes a connection by having one end of a plug hooking onto a corresponding end of a jack to form a fulcrum. The plug then functions as a lever by rotating about that fulcrum until it mates with the jack.

Figure 1A:
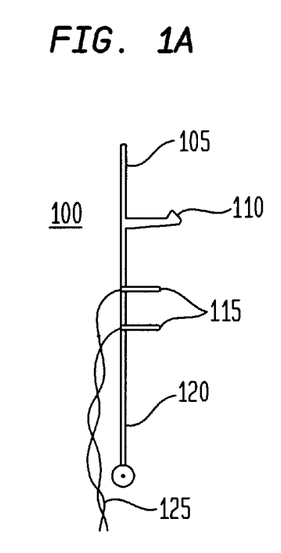
FIGS. 1(a)–1(e) are schematic diagrams of a plug and a jack in accordance with the present invention.

A plug 100 is illustrated in FIG. 1(a). The plug 100 includes a handle 105 on one end. When the plug 100 functions as a lever, the handle 105 serves as one end of that lever. The other end of the lever is the plug fulcrum section 120. The plug 100 further includes a latch 110 that it is located proximate to the handle 105. The latch extends somewhat perpendicularly from the plug 100. A pair of contacts 115 are located between the latch 110 and the plug fulcrum section 120. Cordage 125 is electrically connected to the contacts 115. Although one pair of contacts 115 is shown in the plug 100, it is understood that any plurality of contacts can be included within the plug 100.

In one embodiment of the invention, cordage 125 exits plug 100 at plug fulcrum section 120. As such, cordage 125 is automatically directed toward a back plane (not shown) through a trough 270 as detailed in FIGS. 2 and 3(a)–(c). This keeps the immediate area clear of cordage 125, thereby providing a neat appearance and making it easier for the craftsperson to locate specific jack positions. Also, because the cordage 125 does not come straight out, the latch engagement is unaffected when cordage 125 is manipulated, for cord tracing for example. Latching in this configuration can be implemented using a snap action latch mechanism.

Figure 1B:
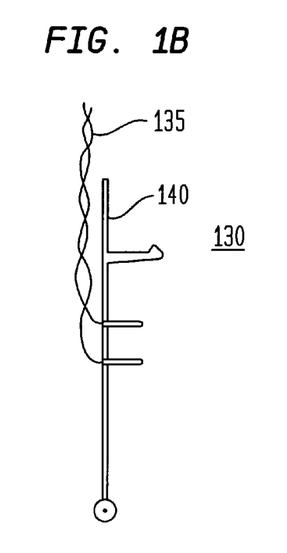

Referring now to FIG. 1(b), a plug 130 can also have cordage 135 exit at a handle 140. Since cordage 135 directs away from the back plane in this instance, care must be taken to keep cordage 135 from interfering with patch cord installation or removal. A wider trough may be required and a positive latch with a release mechanism may be required. The remaining illustrations and description employ a snap action latch, however, a positive latch with a release mechanism could also be used.

Figure 1C:
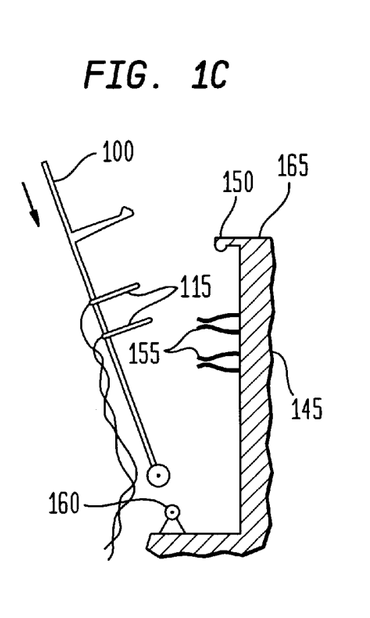
Figure 1D:
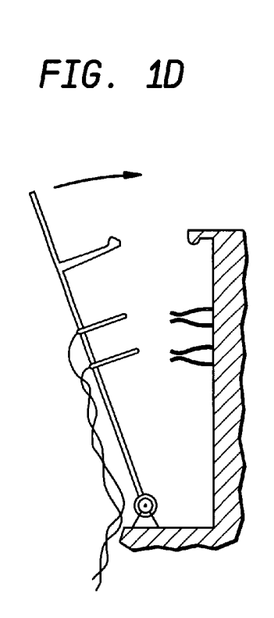
Figure 1E:
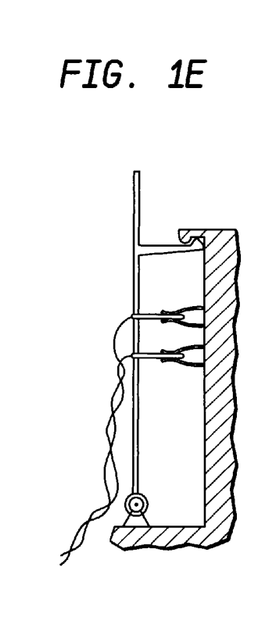

Referring now to FIGS. 1(c)–1(e), mating of plug 100 to a jack 145 is illustrated. As shown jack 145 includes a corresponding latch 150, corresponding contacts 155 and a jack fulcrum section 160. Referring specifically to FIG. 1(c), plug fulcrum section 120 engages jack fulcrum section 160. The angle of engagement is sufficiently offset to prevent engagement of latch 110 with corresponding latch 150 and contacts 115 with corresponding contacts 155. Engagement of the latches and contacts is prevented until the fulcrum sections 120 and 160 are fully engaged and the plug rotated towards the jack. Referring now to FIGS. 1(d) and 1(e), handle 105 is used as a lever to rotate plug 100 towards jack 145 until corresponding latch and contact connection is achieved.

Figure 2:
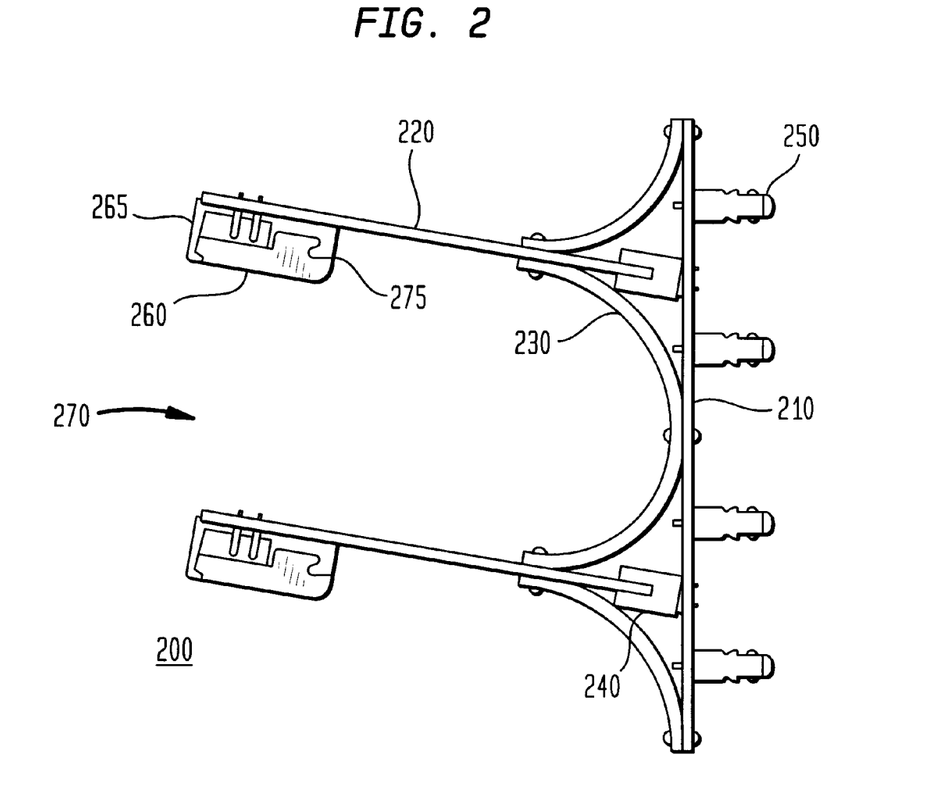
FIG. 2 is a side cross sectional view of a jack mounted on a support structure in accordance with the present invention.

As illustrated in FIG. 1(c), corresponding jack 145 further includes a label surface 165. One of the advantages of the cross connect system is that label surface 165 is positioned frontward as shown below and the resulting connection is implemented behind label surface 165. This implementation maximizes the area in the cross connect field that is devoted to either the label or trough space. This advantage is shown in more detail with respect to FIGS. 2 and 3(a)–3(c). Referring to FIG. 2, a cross sectional view of a printed wiring board utilizing the cross connect system according to the principles of the invention is shown. Cross connect system 200 has a backplane printed wiring board (PWB) 210 and at least one printed wiring board 220 connected to board 210 using support structures 230 and edge card connectors 240. Connection blocks 250 are attached to board 210 to permit connections with other boards (not shown). Specifically, a jack 260 is connected to the board 220. Jack 260 has a label surface 265 that faces away from the board 210.

Figure 3A:
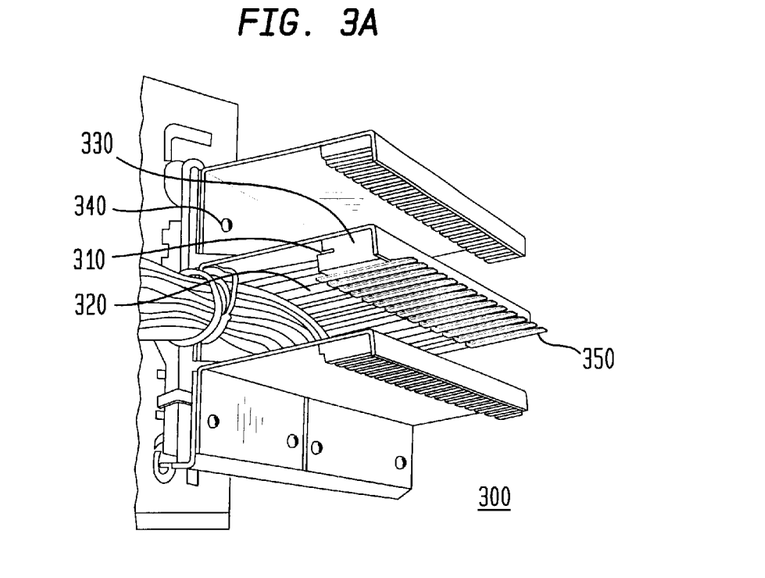
FIGS. 3(a)–3(c) show multiple perspective views of the embodiment illustrated in FIG. 2.
Figure 3B:
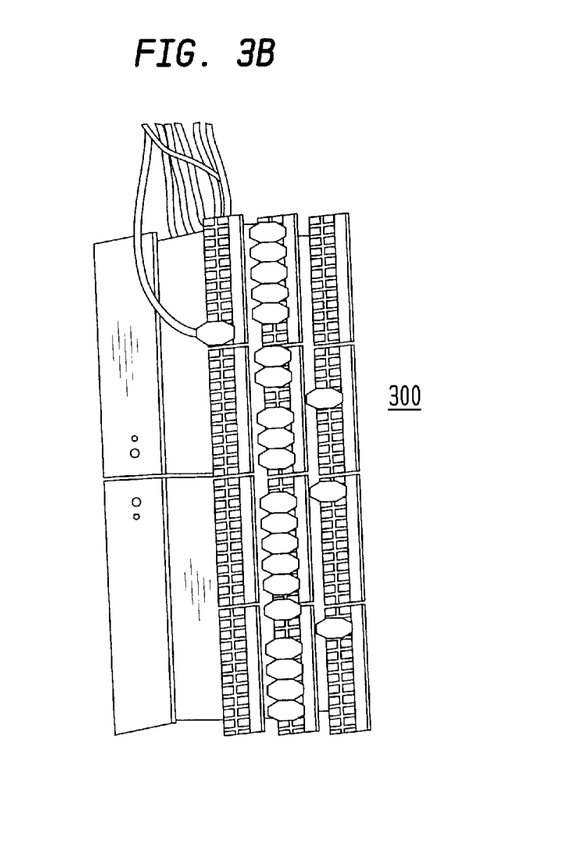
Figure 3C:
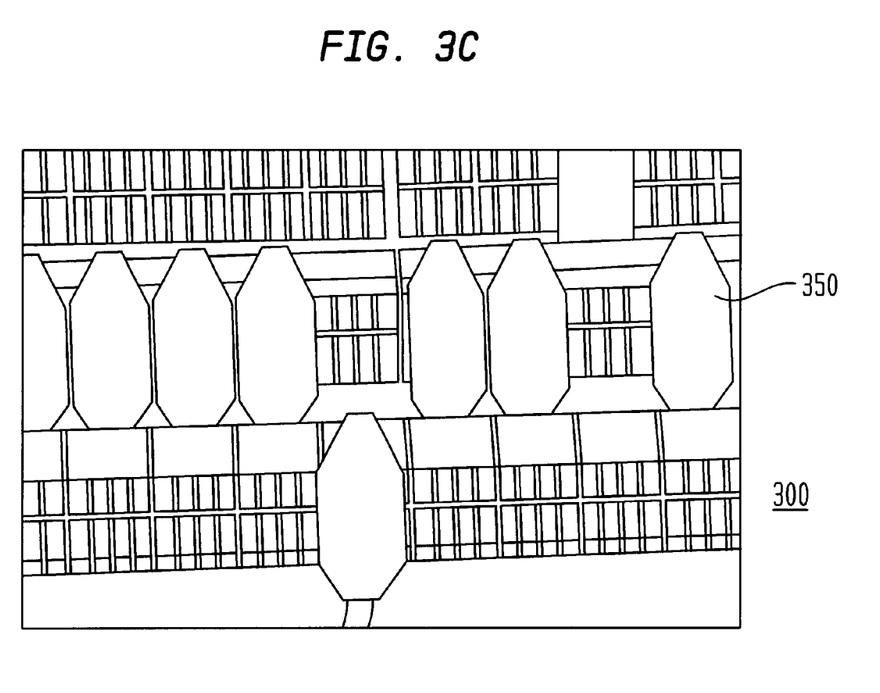

As previously shown in FIG. 1(e) the connection between a plug and a jack 260 is made behind label surface 265. If cross connect system 200 further utilizes a scheme where cordage exits at a fulcrum end 275 towards board 210 and into a trough 270, then the only visible object beyond label surface 265 is the relatively small handle of the plug. This is shown in FIGS. 3(a)–3(c). Specifically, FIG. 3(a) shows a perspective view of a cross connect system 300 with a mated plug and a jack 310. Cordage 320 exits away from label surface 330 and into a trough area 340. FIG. 3(b) shows a bottom up view of FIG. 3(a) and FIG. 3(c) shows a close up view of a mated plug and jack 310. FIGS. 3(a) and 3(c) show that label surface 330 is unobstructed except for the minor presence of handle 350 of mated plug and jack 310. An easy to read label surface is highly valued during cord tracing and other such activities.

Exemplary Cross Connect System

Referring to FIGS. 4(a), 4(b) and 5(a)–5(c), there is shown an exemplary embodiment of a cross connect system 400 in a snap in module configuration. In general, system 400 consists of a jack 410, plug 415, and support structure 500.

Figure 4A:
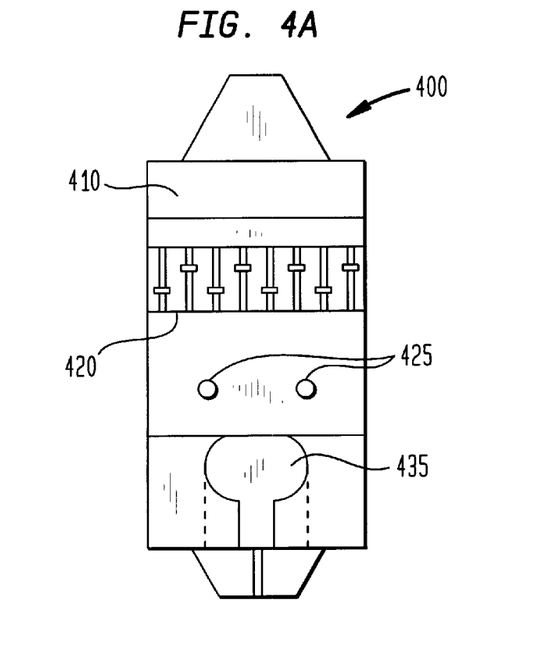
FIGS. 4(a) and 4(b) are a rear and side cross sectional view of a mated plug and jack in accordance with the present invention.
Figure 4B:
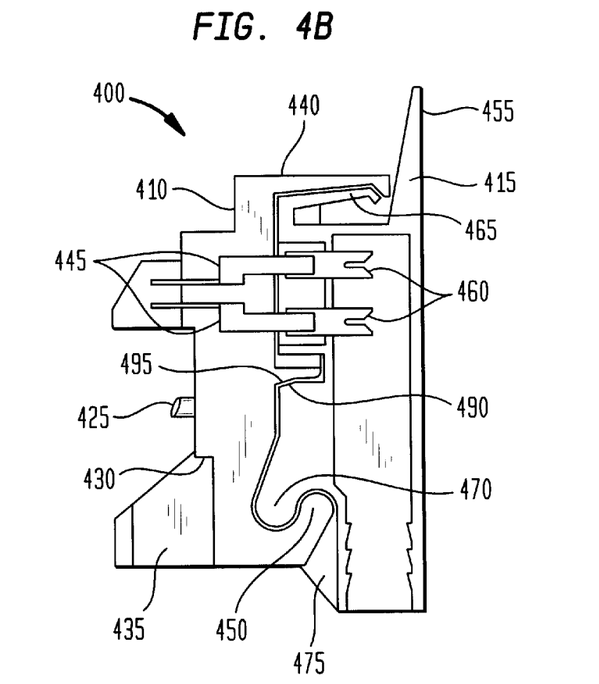

Referring specifically to FIGS. 4(a) and 4(b), a jack 410 is a 4-pair jack that includes an attached cable termination field or wire termination port slots 420, guide posts 425 to keep the wires properly spaced and routed, cable jacket stop shelf 430 and a cable retainer 435. Jack 410 also includes a label surface 440 and jack contacts 445. Jack 410 further includes a hinge bearing hook 450 for rotatably connecting with the plug 415.

Referring still to FIGS. 4(a) and 4(b), plug 415 includes a handle 455, plug contacts 460, a latch 465, a plug bearing hook 470 and an anti-snag rib 475 that prevents the plug bearing hook from snagging on cables as the jack is installed or removed.

Figure 5A:
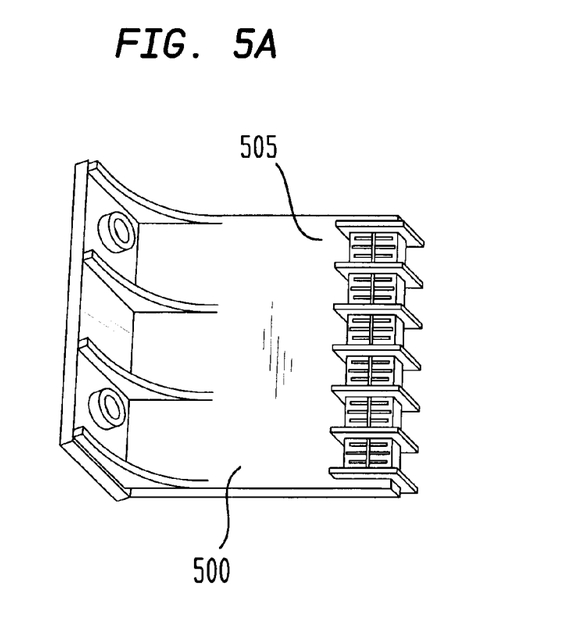
FIGS. 5(a)–5(c) are perspective views of a slidable connector on a support system in accordance with the embodiment shown in FIGS. 4(a)–4(b)
Figure 5B:
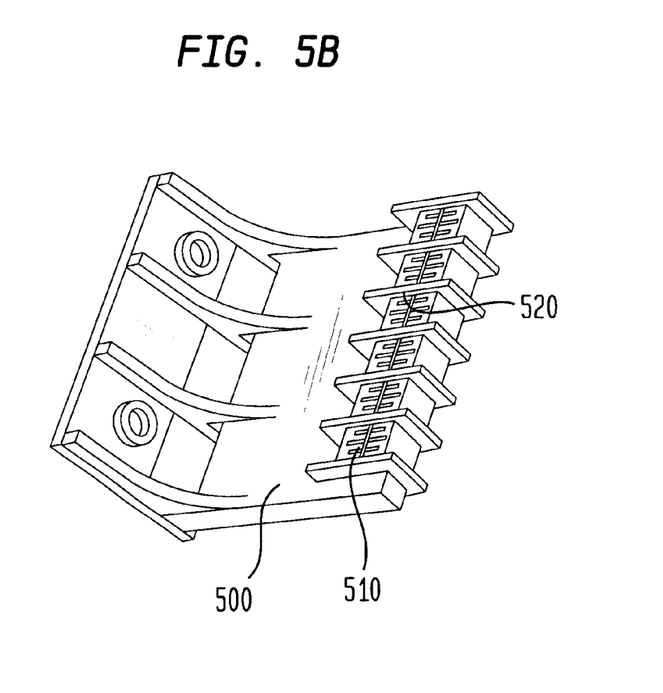
Figure 5C:
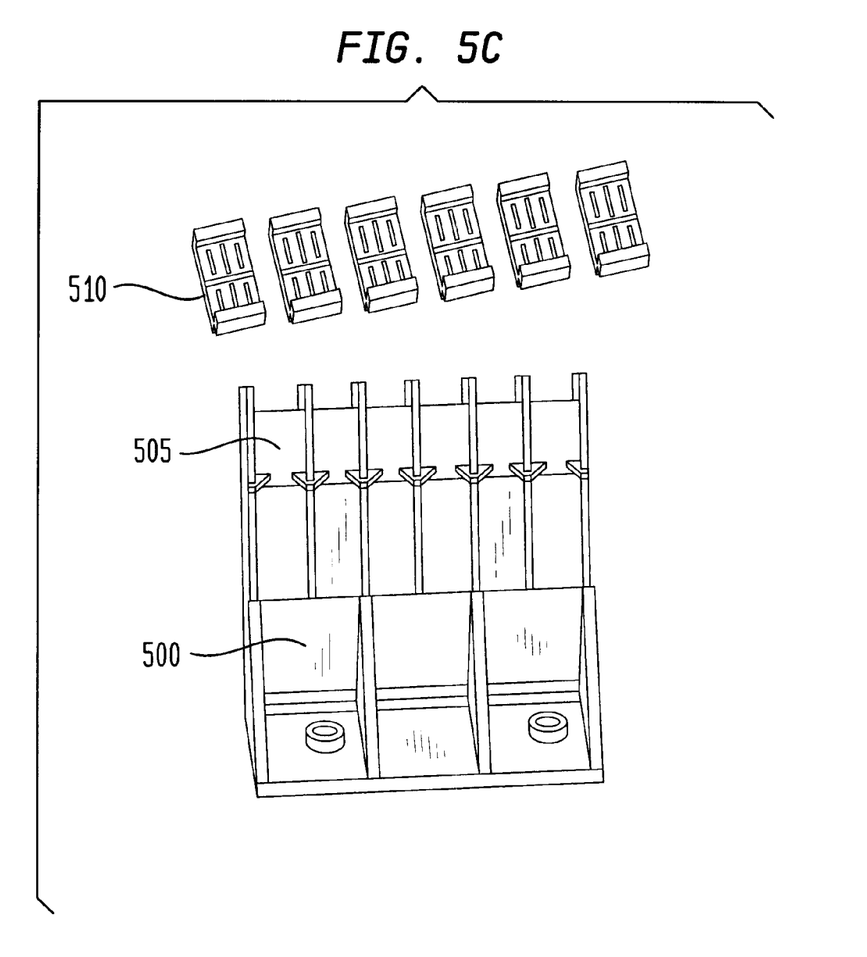

Referring now to FIGS. 5(a)–5(c), a support structure 500 is illustrated. Support structure 500 forms the patch cord trough and also provides additional support for the backplanes when implementing a full row of 24 circuits (not shown). The cross connect system further includes receptacles 505 for receiving jacks 510. The jacks 510 slide into the front end of the receptacles 505 of the support structure 500. Operationally, a jack 510 snaps into the receptacles 510 of the support structure 500. These jacks can be easily inserted, removed and replaced from the support structure 500. Side walls 520 of the receptacles 505 project out beyond the main part of the jack body and function as partitioning walls to keep a plug from making contact to the circuits in the two jacks at the same time. This is illustrated in more detail below with respect to partitioning walls FIG. 8(a).

Figure 6A:
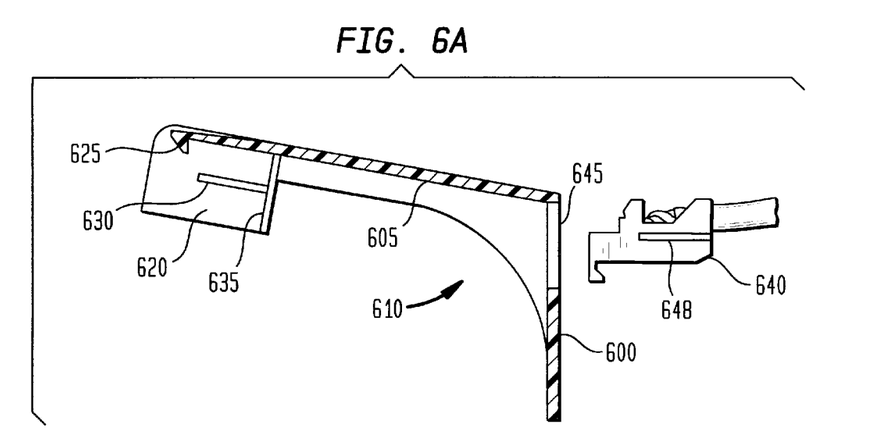
FIGS. 6(a)–6(c) illustrate, from a cross-sectional perspective, the mounting of the jack module of FIGS. 5(a)–5(c) on to a support structure in accordance with the present invention.
Figure 6B:
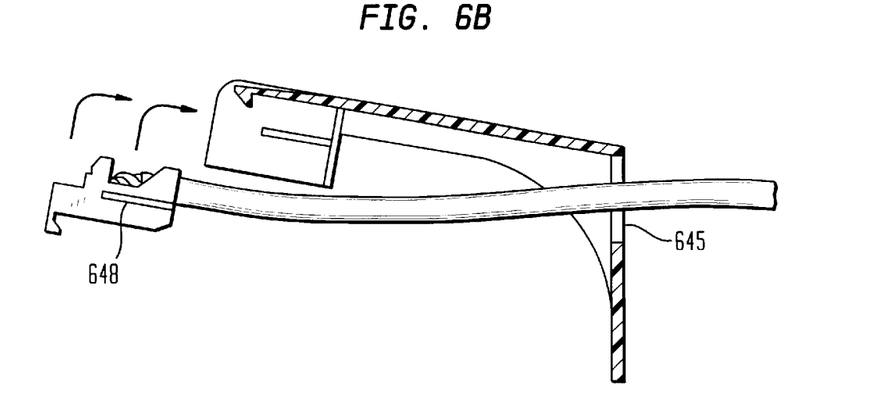
Figure 6C:
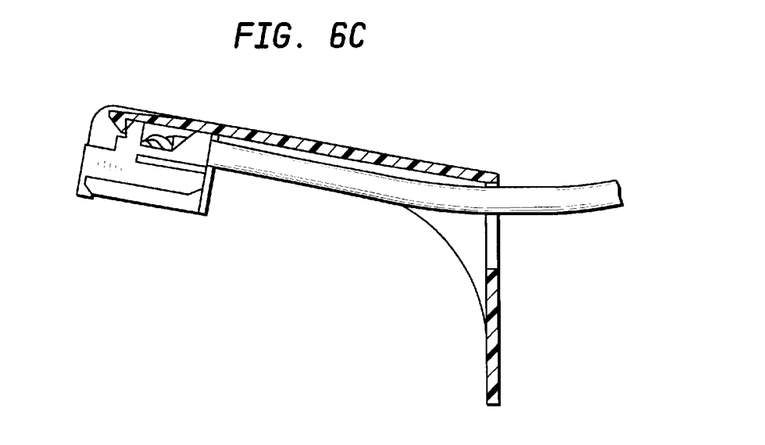

Referring now to FIGS. 6(a)–6(c), a support structure 605 is attached to a backplane 600. Support structure 605 extends out about four inches from backplane 600 to form a patch cord trough 610. Support structure 605 has receptacles 620 for receiving jacks. Each receptacle has a latch 625, rail 630 and stop shelf 635. Operationally, a jack 640 is inserted through a hole 645 in backplane 600 and snapped into a receptacle 620 on a front end of support structure 605. There is a groove 648 in jack 640 for mating with rail 630 in receptacle 620. The groove 648 and the rail 630 serve to guide the jack 640 onto support structure 605 until the stop shelf 635 is encountered and the latch 625 engages jack 640. The rail 630, stop shelf 635, and latch 625 act in combination to hold the jack 640 in receptacle 620 on support structure 605.

Figure 7A:
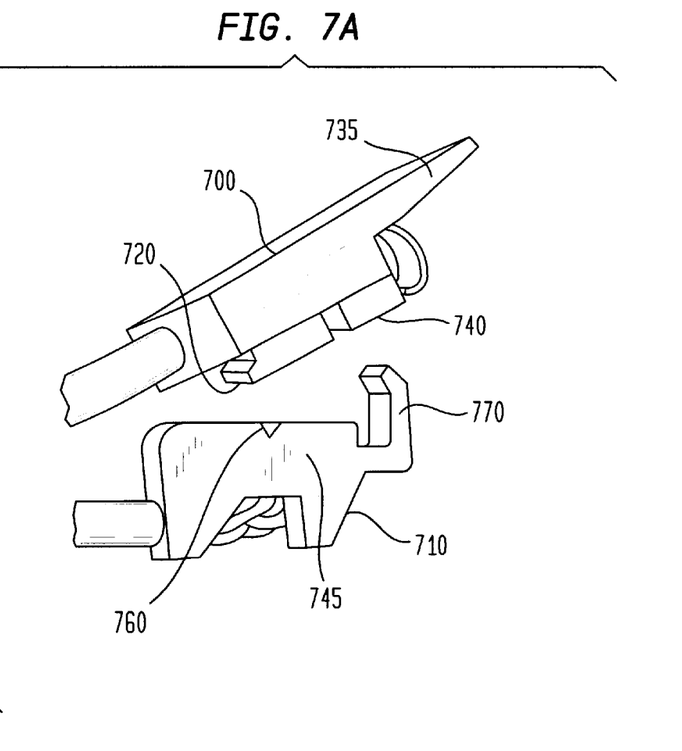
FIGS. 7(a) and 7(b) are side views of a plug and jack in accordance with the present invention.
Figure 7B:
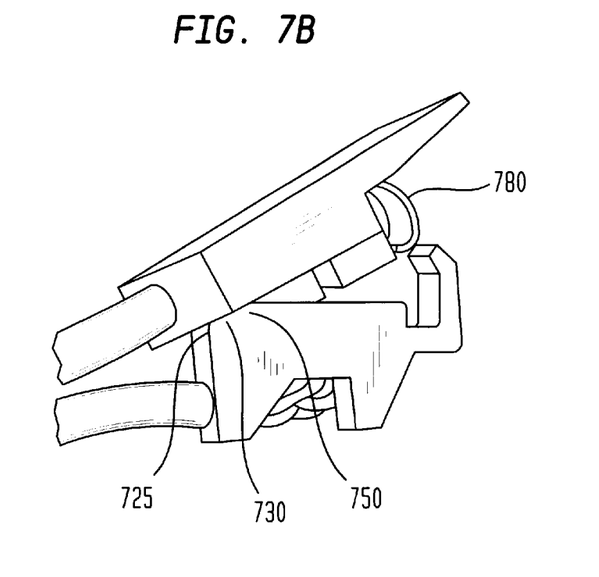

Referring now to FIGS. 7(a) and 7(b), a patch cord or plug 700 is mated with a jack 710 in accordance with the principles of the present invention. The following operational description is accurate for any jack and plug utilizing the concepts of the present invention. A plug bearing hook 720 is hooked onto a hinge bearing surface 725, formed by the hinge bearing hook 730, which are both behind the partitioning wall 820 of FIG. 8(a). The plug 700 is then rotated into its position by using the handle 735 as a lever to force the plug contacts 740 to mate with the jack contacts 745.

Specifically, as plug 700 rotates about the fulcrum point 750 toward the jack 710, the plug spring latch 780 engages a latch 770, and snaps into place. Guide surfaces control the rotation path so that the contacts mate in a precise manner. Specifically, the plug 700 engages the side guide surfaces 830 of FIG. 8(a) before the plug 700 fully engages the hinge bearing hook 730. After the hook 730 is engaged, the jack 710 starts to rotate about the bearing hook 730. Prior to any contact engagement, plug 700 engages a guide surface 495 of FIG. 4(b) approximately perpendicular to the side guide surfaces 830 of FIG. 8(a). The guide surfaces 490 and 495 of FIG. 4(b) serve as a guide insuring that jack 710 remains fully seated onto hinge bearing hook 730, as plug 700 completes a full rotation.

Figure 8A:
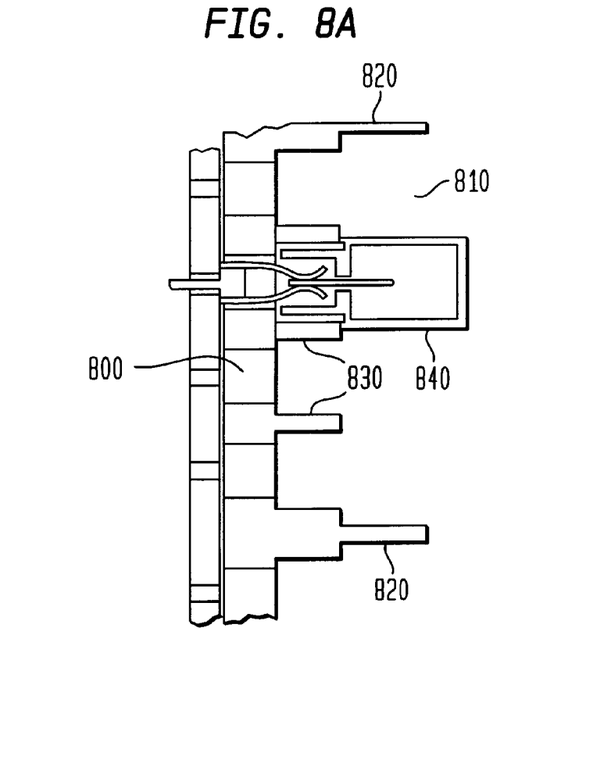
FIG. 8(a) is a partial, cross-sectional top view of a mated jack and a one pair patch cord plug in accordance with the present invention.

The side guide surfaces 830 of FIG. 8(a) extend beyond the hinge bearing hook 730 as well as the jack contacts 745. Thus, when the plug contacts 740 are mated with the jack contacts 745, the connections are completed below the outer edges of the side guide surfaces 830 of FIG. 8(a). This protects the contacts for both the plug 700 and the jack 710. Because the side guide surfaces 830 of FIG. 8(a) are separated in distance to accommodate the width of the plug 700, the side guide surfaces of FIG. 8(a) also provide lateral support, holding the plug 700 firmly in place. Therefore, manipulating the patch cord's cordage has very little effect on the security of the patch cord's connection. The only practical way to disengage a patch cord is by pushing on the handle 735. If an attempt is made to disengage the patch cord at the point where the cordage enters the plug 700, pushing with several pounds of force is required because the mechanical advantage is working against that attempt.

Design for Single or Multiple Connections

Figure 8B:
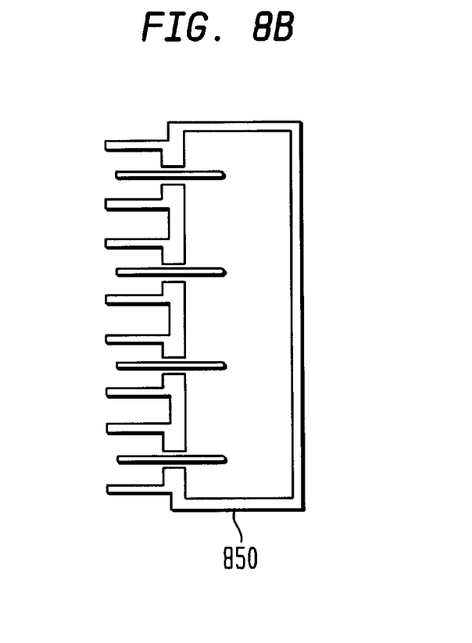
FIG. 8(b) is a partial, cross-sectional top view of a jack and a four pair patch cord plug in accordance with the present invention.

As illustrated in FIGS. 8(a) and 8(b), the jacks of the present invention permit connections with plugs of different sizes, varying from 1-pair to 4-pair. Referring to FIG. 8(a) a jack 800 has at least one 4-pair connection site 810. Jack 800 includes a partitioning wall 820 after every 4-pair connection sites 810. Partitioning walls 820 prevent plugs from crossing over and making connections to contacts in two jacks simultaneously. Each 4-pair connection site further includes the previously described side guide walls 830. Each site 810 can accommodate a single plug 840, a 4-pair plug 850 as shown in FIG. 8(b), or any pair size in between.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications that come within the scope of the appended claim is reserved.

What is claimed:

1. A connector system for telecommunications electrical connections, said system comprising:
   a base structure,
   a cantilevered support structure having a rear portion and a front portion, said rear portion of said support structure being attached to said base structure,
   a jack, said jack adapted to be snapped on to said front portion of said support structure, said jack having a front end positioned near said front portion of said support structure and a rear end extending toward said rear portion of said support structure, said jack having a label surface facing outwardly from said front end, said jack having a latch receptacle located near said front end and a pivot connection located near said rear end, said jack having wiring extending through the back of said base structure, said support structure forming a wiring trough, said wiring trough being formed adjacent to the rear portion of said support structure and in front of said base structure; and a plug, said plug having a pivot end, a latch end and a electrical contacts located between said pivot end and said latch end, said plug adapted to be affixed to said jack by means of first establishing a fulcrum point common to said jack and said plug by engaging said pivot end with said pivot connection of said jack, and said plug being rotated about said fulcrum point restrained by guide surfaces until an electrical connection is made with said jack and the latch end of said plug mechanically latches with said latch receptacle of said jack, said plug having wiring extending from said pivot end of said plug toward said rear portion of said support structure to pass into said wiring trough wherein said label area is visible without interference from said wiring.

2. A connector system as defined in claim 1 wherein said plug comprises 1, 2, 3 or 4 pair of connectors and can mate with said jack individually or in a combination thereof to make up a four pair circuitry.

3. A connector system as defined in claim 1 wherein said front portion of said support structure includes at least one receptacle, said at least one receptacle having a latch, a rail and a stop shelf, and said jack having a groove corresponding with said rail, wherein said groove and said rail guide said jack into said receptacle rearwardly until said jack encounters said stop shelf and said latch engages said jack.

4. A connector system as defined in claim 3 wherein said front portion of said support structure comprises a plurality of receptacles in a plurality of rows.

5. A connector system for telecommunications electrical connections, said system comprising:

a base structure, a support structure having a rear portion and a front portion, said rear portion of said support structure being attached to said base structure, a jack, said jack adapted to be snapped on to said front portion of said support structure, said jack having a front end positioned near said front portion of said support structure and a rear end extending toward said rear portion of said support structure, said jack having a label surface facing outwardly from said front end, said jack having a latch receptacle located near said front end and a pivot connection located near said rear end, said support structure forming a wiring trough, said wiring trough being formed adjacent to the rear portion of said support structure and in front of said base structure; and a plug, said plug having a pivot end, a latch end and a electrical contacts located between said pivot end and said latch end, said plug adapted to be affixed to said jack by means of first establishing a fulcrum point common to said jack and said plug by engaging said pivot end with said pivot connection of said jack, and said plug being rotated about said fulcrum point until an electrical connection is made with said jack and said latch end of said plug mechanically latches with said latch receptacle of said jack, said plug having wiring extending from said pivot end of said plug toward said rear portion of said support structure to pass into said wiring trough wherein said label area is visible without interference from said wiring.

6. A connector system for telecommunications electrical connections, said system comprising:

a base structure, a support structure having a rear portion and a front portion, said rear portion of said support structure being attached to said base structure, a jack affixed to said front portion of said support structure, said jack having a front end positioned near said front portion of said support structure and a rear end extending toward said rear portion of said support structure, said jack having a label surface facing outwardly from said front end, said jack having a latch receptacle located near said front end and a pivot connection located near said rear end, said support structure forming a wiring trough, said wiring trough being formed adjacent to the rear portion of said support structure and in front of said base structure; and a plug having a pivot end, a latch end and electrical contacts located between said pivot end and said latch end, said plug adapted to be affixed to said jack by means of first establishing a fulcrum point common to said jack and said plug by engaging said pivot end with said pivot connection of said jack, and said plug being rotated about said fulcrum point until an electrical connection is made with said jack and the latch end of said plug mechanically latches with said latch receptacle of said jack, said plug having wiring extending from said pivot end of said plug toward said rear portion of said support structure to pass into said wiring trough wherein said label area is visible without interference from said wiring.

7. A connector system as defined in claim 6 wherein said front portion of said support structure comprises a plurality of receptacles in a plurality of rows.

8. A connector system for telecommunications electrical connections, said system comprising:

a base structure, a support structure having a rear portion and a front portion, said rear portion of said support structure being attached to said base structure, a jack affixed to said front portion of said support structure, said jack having a front end positioned near said front portion of said support structure and a rear end extending toward said rear portion of said support structure, said jack having a label surface facing outwardly from said front end, said jack having a latch receptacle located near said front end and a pivot connection located near said rear end, said pivot connection adapted to form a common pivot point with a plug to enable the plug to be rotated about said pivot point to be retained by said latch receptacle forming an electrical connection therebetween, said support structure forming a wiring trough, said wiring trough being formed adjacent to the rear portion of said support structure and in front of said base structure to enable wires from the plug to pass into said wiring trough wherein said label area is visible without interference from said wiring.

* * * * *